United States Patent Office 3,345,433
Patented Oct. 3, 1967

3,345,433
COMPOSITIONS OF VINYL CHLORIDE/
VINYL ACETATE POLYMERS AND A
POLYGLUTAMATE
David Wasserman, Springfield, John D. Garber, Allendale, and Frederick M. Meigs, Westfield, N.J., assignors to Merck & Co., Inc., Rahway, N.J., a corporation of New Jersey
No Drawing. Filed Nov. 24, 1964, Ser. No. 413,622
20 Claims. (Cl. 260—857)

ABSTRACT OF THE DISCLOSURE

The flexibility of homopolymers of vinyl acetate, vinyl chloride and copolymers thereof is improved by the addition of 0.1 to 10 parts by weight, per 100 parts of the above polymer, of a polyglutamate material having the following recurring units:

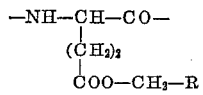

This invention relates to novel compositions of matter and to methods for producing them, and is directed to (A) a material selected from the group consisting of (1) normally solid polymers of vinyl chloride, (2) normally solid polymers of vinyl acetate, (3) normally solid copolymers of vinyl chloride and vinyl acetate and (4) mixtures of at least two, that is two or more, of said (1)–(3) and a material for imparting flexibility and shatter resistance to (A).

In the course of experimentations, it was surprising to discover that when minor amounts of a material which shall hereinafter be termed material (B) is incorporated in said material (A) that it increases the flexibility and decreases the brittle temperature thereof. Said material (B) is a material whose molecular weight is at least 5000 and selected from the group consisting of (a) homopolymers consisting essentially of a unit which recurs and is within the generic formula:

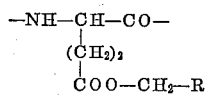

(b) copolymers consisting essentially of a number of at least two differing units within said generic formula and (c) mixtures of at least two of said (a)–(b); with R being a radical selected from the group consisting of phenyl and alkyl radicals of 5–21 carbon atoms. In general the quantity by weight of (B) to the quantity by weight of said material (A) is about 0.1 to 10 and preferably 0.5–5 parts by weight of (B) per 100 parts of (A).

Said materials (B) are prepared by first reacting L-, D- or mixtures of L- and D-glutamic acid with an alcohol which may be represented by R—CH$_2$OH wherein R is a phenyl or a branched or straight chain hydrocarbon radical of 5–21 carbon atoms thereby to provide the R—CH$_2$— ester of glutamic acid. Then the ester is reacted with phosgene to produce the anhydride thereof. The anhydride or mixture of at least two of the anhydrides in any and all proportions are subjected to condensation-polymerization reaction thereby to produce homopolymers and copolymers respectively consisting essentially of a unit which recurs and a number of differing units of the formula:

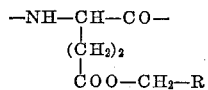

The number of said units is such that the molecular weights of said homopolymers and copolymers is at least 5000 and preferably at least 10,000 and may be as high as 1,000,000 or higher.

Said material (B) may be intimately combined with said material in a number of different ways. One manner of such achievement is to dissolve in methylene chloride the materials (A) and (B) in the desired proportions as before defined. Then after solution is effected, the methylene chloride solvent is removed therefrom whereby there is provided a composition of matter consisting of a major proportion of (A) having a minor but sufficient amount of material (B) distributed therethrough to improve the flexibility thereof and to reduce the brittle temperature thereof. Said novel compositions have good ageing properties at normal, low and elevated temperatures, and, the (B) employed therein will not bleed or volatilize out or be degraded at elevated temperatures at which said compositions are normally subjected and in addition will not separate out at the low temperatures at which said compositions are normally subjected.

The following are specific examples of methods for producing certain novel compositions of this invention and are given by way of illustration and not limitation. The materials (A) employed in Examples 1–3 is a homopolymer of vinyl chloride, available on the market as "Bakelite VAGH" and the materials (B) employed and hereinafter referred to as materials (a–1), (a–2) and (a–3) are respectively materials consisting essentially of a recurring unit which is of the structural formula before set forth and wherein R is respectively C$_6$H$_5$, n-C$_5$H$_{11}$ and n-C$_{11}$H$_{23}$.

Examples 1–3

Into three separate vessels containing 400 mls. of methylene chloride were respectively added 2 grams of (a–1) having a molecular weight of 1,000,000, 2 grams of (a–2) having a molecular weight of 139,000 and 2 grams of (a–3) having a molecular weight of 48,000 and warmed together for quickly achieving solution. Then after clear solutions are obtained, there is added 98 grams of said polyvinyl chloride to each of them. The mix is heated to and maintained at 35° C. for 1 hour for effecting solution. Then a portion of each of them is poured into a separate shallow box-like structure, whose bottom has a supporting face of highly polished smooth glass. Each of said shallow boxes having a quantity of said respective masses therein is placed in a vacuum oven and maintained therein under high vacuum conditions and a temperature of 25° C. until all of the methylene chloride has been evaporated therefrom leaving behind a solid film measuring about .05″ in thickness. The films were stripped off of the glass bases. Said films have greater flexibility at normal and sub-normal temperatures than polyvinyl chloride free of plasticizer.

Examples 4–6

Follow the same procedure as that of Examples 1–3, except that for the polyvinyl chloride substitute normally solid polyvinyl acetate thereby to obtain normally solid polyvinyl acetate films of improved flexibility.

Examples 7–9

Follow the same procedure as that of Examples 1–3, except that for the polyvinyl chloride substitute normally solid copolymer of vinyl chloride and vinyl acetate thereby to obtain normally solid films of copolymerized vinyl chloride and vinyl acetate of improved flexibility.

*Examples 10–18*

Follow the same procedure as that of Examples 1–9, except that for the materials (*a*–1), (*a*–2), (*a*–3) substitute respective materials (*a*–4), (*a*–5), and (*a*–6) having molecular weights of approximately 100,000 and which respectively consist essentially of 60% by weight of the following units:

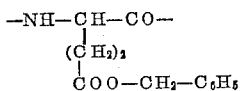

and 40% by weight of units of said formula except that $C_5H_{11}$ is substituted for said $C_6H_5$; 50% by weight of each of two units which are the same as that above set forth except that in one said $C_6H_5$ is replaced by $C_7H_{15}$ and in the other the $C_6H_5$ is replaced by $C_{11}H_{23}$; and 90% by weight of one unit and 10% by weight of another unit, with the former differing from that above set forth by the substitution of $C_5H_{11}$ for the $C_6H_5$ and the latter differing therefrom by the substitution of $C_9H_{19}$ therefor. Thereby there are obtained normally solid polyvinyl chloride, polyvinyl acetate and copolymerized vinyl chloride and vinyl acetate films of improved flexibility.

Some of said materials (B) as well as methods for producing them are disclosed in the U.S. patent application of Wasserman, et al., Ser. No. 341,424, filed Jan. 30, 1964. Those parts of said application which disclose said materials (B) and methods for producing them are included herein and by this reference are made part hereof and shall have the same force and effect as if they were in their entireties recited herein.

Since certain changes and modifications may be made in the specific inventions disclosed herein without departing from the scope thereof, it is intended that all matter contained in the foregoing description shall be interpreted as illustrative and not in a limiting sense.

We claim:

1. A composition of matter comprising a major proportion of (A) a material selected from the group consisting of (1) normally solid homopolymers of vinyl chloride, (2) normally solid homopolymers of vinyl acetate and (3) normally solid copolymers of vinyl chloride and vinyl acetate and (4) mixtures of at least two of them and a minor but sufficient amount of (B) in the range of about 0.1 to 10 parts by weight of (B) per 100 parts by weight of (A) to improve the flexibility of (A), said (B) being a material whose molecular weight is at least 5000 and selected from the group consisting of (a) polymers consisting essentially of a unit which recurs and is within the generic formula:

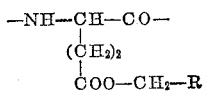

wherein R is a radical selected from the group consisting of phenyl and alkyl radicals of 5–21 carbon atoms, (b) copolymers of at least two differing units within said formula and (c) mixtures of at least two of them.

2. A composition of matter as defined in claim 1, but with (A) being normally solid polyvinyl chloride.

3. A composition of matter as defined in claim 1, but with (A) being normally solid polyvinyl acetate.

4. A composition of matter as defined in claim 1, but with (A) being normally solid copolymerized vinyl chloride and vinyl acetate.

5. A composition of matter as defined in claim 1, but with (B) being a polymer consisting essentially of a unit which recurs and is of the formula:

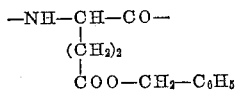

6. A composition of matter as defined in claim 1, but with (B) being a polymer consisting essentially of a unit which recurs and is of the formula:

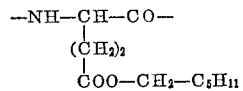

7. A composition of matter as defined in claim 1, but with (B) being a polymer consisting essentially of a unit which recurs and is of the formula:

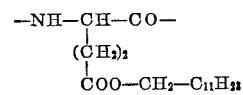

8. A composition of matter as defined in claim 1, but with (A) being normally solid homopolymerized vinyl chloride and (B) being a polymer consisting essentially of a unit which recurs and is of the formula:

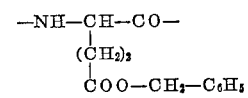

9. A composition of matter as defined in claim 1, but with (A) being normally solid homopolymerized vinyl chloride and (B) being a polymer consisting essentially of a unit which recurs and is of the formula:

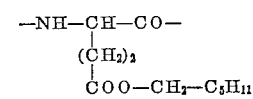

10. A composition of matter as defined in claim 1, but with (A) being normally solid homopolymerized vinyl chloride and (B) being a polymer consisting essentially of a unit which recurs and is of the formula:

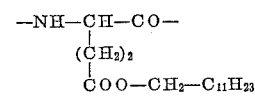

11. The method for improving the flexibility of (A) a material selected from the group consisting of (1) normally solid homopolymers of chloride, (2) normally solid homopolymers of vinyl acetate, (3) normally solid copolymers of vinyl chloride and vinyl acetate and (4) mixtures of at least two of them comprising intimately combining therewith a minor but sufficient proportion of (B) in the range of about 0.1 to 10 parts by weight of (B) per 100 parts by weight of (A) to effectuate said improvement, said (B) being a material having a molecular weight of at least 5000 and selected from the group consisting of (a) polymers consisting essentially of a unit which recurs and is selected from the group within the formula:

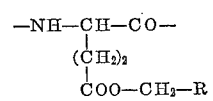

wherein R is a radical selected from the group consisting of phenyl and alkyl radicals of 5–21 carbon atoms, (b) polymers consisting essentially of at least two differing units selected from the group within said formula and (c) mixtures of at least two of them.

12. The method as defined in claim 11, but with (A) being normally solid polyvinyl chloride.

13. The method as defined in claim 11, but with (A) being normally solid polyvinyl acetate.

14. The method as defined in claim 11, but with (A) being normally solid copolymerized vinyl chloride and vinyl acetate.

15. The method as defined in claim 11, but with (B)

being a polymer consisting essentially of a unit which recurs and is of the formula:

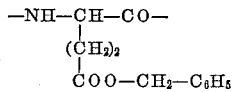

16. The method as defined in claim 11, but with (B) being a polymer consisting essentially of a unit which recurs and is of the formula:

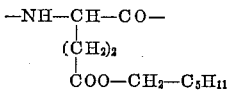

17. The method as defined in claim 11, but with (B) being a polymer consisting essentially of a unit which recurs and is of the formula:

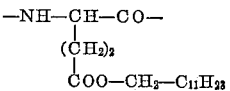

18. The method as defined in claim 11, but with (A) being normally solid homopolymerized vinyl chloride and (B) being a material consisting essentially of a unit which recurs and is of the formula:

19. The method as defined in claim 11, but with (A) being normally solid homopolymerized vinyl chloride and (B) being a material consisting essentially of a unit which recurs and is of the formula:

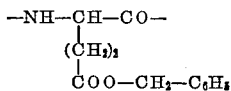

20. The method as defined in claim 11, but with (A) being normally solid homopolymerized vinyl chloride and (B) being a material consisting essentially of a unit which recurs and is of the formula:

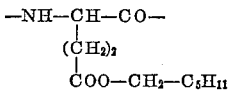

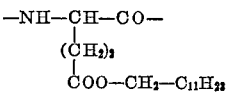

References Cited

UNITED STATES PATENTS

| | | | |
|---|---|---|---|
| 3,119,776 | 1/1964 | Thomas | 260—78 |
| 3,119,794 | 1/1964 | De Vries | 260—78 |
| 3,230,274 | 1/1966 | Garber | 260—857 |

MURRAY TILLMAN, *Primary Examiner.*

P. LIEBERMAN, *Assistant Examiner.*